(12) United States Patent
Jeong et al.

(10) Patent No.: US 12,553,583 B2
(45) Date of Patent: Feb. 17, 2026

(54) LAMP FOR VEHICLE

(71) Applicant: HYUNDAI MOBIS CO., LTD., Seoul (KR)

(72) Inventors: Seok Ho Jeong, Yongin-si (KR); Eun Bi Kwon, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/980,709

(22) Filed: Dec. 13, 2024

(65) Prior Publication Data
US 2025/0224089 A1 Jul. 10, 2025

(30) Foreign Application Priority Data
Jan. 5, 2024 (KR) .................. 10-2024-0002423
Jan. 5, 2024 (KR) .................. 10-2024-0002426

(51) Int. Cl.
*F21S 41/24* (2018.01)
*F21S 41/143* (2018.01)
*F21S 41/151* (2018.01)
*F21S 43/15* (2018.01)
*F21S 43/249* (2018.01)

(52) U.S. Cl.
CPC ............. *F21S 41/24* (2018.01); *F21S 41/143* (2018.01); *F21S 41/151* (2018.01); *F21S 43/15* (2018.01); *F21S 43/249* (2018.01)

(58) Field of Classification Search
CPC ........ F21S 41/24; F21S 41/143; F21S 41/151; F21S 43/15; F21S 43/249; G02B 6/0036; G02B 6/0038; G02B 6/0043; G02B 6/0055; G02B 6/0031; G02B 17/002; B60R 1/12; B60R 2001/1215; B60R 2300/802; B60Q 1/2696; B60Q 1/302; B60Q 1/32; B60Q 1/34; B60Q 3/30; B60Q 3/50; B60Q 9/008; B61L 2207/02; B61L 5/1827; B61L 5/1845; B61L 5/1854
See application file for complete search history.

(56) References Cited

U.S. PATENT DOCUMENTS

| 11,693,273 | B2 * | 7/2023 | Tsang ................ G02F 1/133605 |
| | | | 362/97.1 |
| 2010/0165658 | A1 * | 7/2010 | Huang ................. G02B 6/0018 |
| | | | 362/606 |
| 2019/0324184 | A1 * | 10/2019 | Cai ...................... G02B 6/0021 |

FOREIGN PATENT DOCUMENTS

| KR | 20120021290 A | * | 3/2012 | .......... H10K 59/878 |
| WO | WO-2008065906 A1 | * | 6/2008 | ............ G02B 6/002 |

OTHER PUBLICATIONS

Search English translation of WO-2008065906-A1 (Year: 2008).*
Search English translation of KR 20120021290 A (Year: 2012).*

* cited by examiner

*Primary Examiner* — Omar Rojas Cadima
(74) *Attorney, Agent, or Firm* — NSIP Law

(57) ABSTRACT

A lamp for a vehicle, includes a board part, a light source part including light sources mounted on a front surface of the board part, and an optical resin layer provided on the front surface of the board part, optical resin layer to cover the light sources. The optical resin layer includes an optical body, and first total-reflection optics protruding from a surface of the optical body, integrally formed with the optical body, and the optical resin totally reflects light emitted from the light source part and guides the light to a front surface of the optical body.

16 Claims, 23 Drawing Sheets

LAMP FOR VEHICLE

CROSS-REFERENCE TO RELATED APPLICATION

This application claims the benefit of priority under 35 USC § 119 to Korean Patent Application Nos. 10-2024-0002423 and 10-2024-0002426, both filed on Jan. 5, 2024, in the Korean Intellectual Property Office, the entire contents of which are incorporated herein by reference for all purposes.

BACKGROUND

1. Field

The present disclosure relates to a lamp for a vehicle.

2. Description of the Related Art

Generally, vehicles are provided with various types of lamps that have a lighting function for easily identifying objects located around the vehicles during driving at night and a signaling function for informing other vehicles or road users of the driving states of the vehicles.

Recently, lamps for a vehicle are being developed in various forms to enhance the aesthetics of the exterior of the vehicle depending on the needs of users who value design. In particular, lamps for a vehicle that apply a technology for implementing a surface emission lighting image through an optical system that applies a design pattern are being developed.

However, due to the design pattern applied to the optical system that implements the surface emission lighting image conventionally, the light transmittance is low, and thus, it is used only in some lamps, such as tail lamps. In addition, the optical system that implements the surface emission lighting image conventionally is spatially limited and disadvantageous in costs because a separate lens or structure, such as a Fresnel lens, is added to improve the uniformity.

Therefore, it is necessary to develop a surface emission optical system that secures a luminosity without problems in implementing the functions of various types of lamps, improves uniformity, and is advantageous in terms of costs as well.

SUMMARY

The present disclosure has been made to solve the above-mentioned problems occurring in the prior art while advantages achieved by the prior art are maintained intact.

An aspect of the present disclosure provides a lamp for a vehicle that may improve a light efficiency while securing uniformity, thereby implementing a high-luminosity surface emission image.

An aspect of the present disclosure also provides a lamp for a vehicle that does not require an additional process or a separate lens to implement a uniform surface emission image, thereby having fewer spatial restrictions and being advantageous in terms of costs.

The technical problems to be solved by the present disclosure are not limited to the aforementioned problems, and any other technical problems not mentioned herein will be clearly understood from the following description by those skilled in the art to which the present disclosure pertains.

In a general aspect of the disclosure, a lamp for a vehicle, includes: a board part; a light source part including a plurality of light sources mounted on a front surface of the board part; and an optical resin layer provided on the front surface of the board part, optical resin layer configured to cover the plurality of light sources, wherein the optical resin layer includes: an optical body; and a plurality of first total-reflection optics protruding from a surface of the optical body, integrally formed with the optical body, and wherein the optical resin is configured to totally reflect light emitted from the light source part and guide the light to a front surface of the optical body.

When direction facing the optical resin layer from the board part is defined as a first direction, a direction being perpendicular to the first direction, and in which the optical resin layer extends, may be defined as a second direction, and a direction being perpendicular to the first direction and the second direction may be defined as a third direction, wherein the optical body may include: a front surface being a surface facing the first direction; a rear surface being a surface facing the board part; and a side surface provided between the front surface and the rear surface, wherein the first total-reflection optic may include: a plurality of front total-reflection optics formed on the front surface of the optical body, and the plurality of front total-reflection optics are formed to extend in the second direction or the third direction, and wherein the plurality of front total-reflection optics may be arranged in a direction crossing an extension direction of the front total-reflection optics.

The first total-reflection optic may further include: a plurality of side total-reflection optics formed on a side surface of the optical body, the first total-reflection optic formed to extend in the first direction or the second direction, wherein the plurality of side total-reflection optics may be arranged in a direction crossing an extension direction of the side total-reflection optics.

A cross-sectional shape of the first total-reflection optic in a direction being perpendicular to an extension direction of the first total-reflection optic may be formed in an arc shape or a polygonal shape.

The lamp of may further include an outer lens provided on a front surface of the optical resin layer, wherein the outer lens may include: a lens body configured such that at least a partial area of the optical body in the first direction is accommodated therein, and in which an accommodation space opened toward the board part is formed; and a fixing part formed in the lens body, and configured to be assembled with the optical resin layer, wherein the optical resin layer may further include an assembly part configured to correspond to the fixing part.

The assembly part may include an assembly groove formed on a side surface of the optical body is concave, wherein the fixing part may include a fixing boss formed at a rear end of the lens body and protruding toward the accommodation space to be inserted into the assembly groove.

The assembly part may include an assembly boss protruding from a side surface of the optical body, wherein the fixing part may include a stop boss formed to be stopped by the assembly boss to prevent the outer lens from deviating from the optical resin layer in the first direction.

The outer lens may include a plurality of second total-reflection optics integrally formed with at least one of a front surface and a side surface of the lens body, wherein the outer lens may be configured to guide light emitting from the optical resin layer through internal total reflection.

The second total-reflection optics may extend in a direction crossing a direction, in which the first total-reflection optic extends, wherein the plurality of second total-reflection optics may be arranged to be spaced apart from each other in a direction crossing a direction, in which the second total-reflection optics extend.

In another general aspect of the disclosure, a lamp for a vehicle, includes: a board part; a light source part including a plurality of light sources mounted on a front surface of the board part; and an optical resin layer provided on the front surface of the board part, the optical resin layer configured to cover the plurality of light sources, wherein the board part includes a plurality of reflective bosses protruding from a front surface thereof to reflect light emitted from the light source part forward.

The optical resin layer may include: an optical body; a light source accommodating part formed in the optical body to accommodate the plurality of light sources; and a plurality of boss accommodating part formed to correspond to the reflective bosses and formed in the optical body to accommodate the plurality of reflective bosses.

The reflective bosses may be formed in a convexly curved shape or a polygonal column shape.

Each of the reflective bosses may include a reflective surface formed to face the light source part, the reflective bosses being configured to reflect the light emitted from the light source part, and an inclined surface provided in an opposite direction to a direction facing the light source part of the reflective surface.

The board part may further include a printing layer formed by printing a reflective material on a surface of the reflective boss.

The optical resin layer may include an optical body, and a plurality of air gaps formed in an interior of the optical body, wherein the plurality of air gaps may be configured to guide light having reached the air gaps through internal total reflection.

When a direction facing the optical resin layer from the board part is defined as a first direction, and a direction being perpendicular to the first direction, and in which the optical resin layer extends, is defined as a second direction, the air gaps may be formed such that a width in the second direction is greater than a width in the first direction, wherein a cross-sectional shape of the air gaps in a direction being perpendicular to the second direction may be formed in a circular shape or a polygonal shape.

The lamp may further include an outer lens assembled on a front surface of the optical resin layer, the outer lens including an accommodation space accommodating the optical body, wherein the optical body may include a first area accommodated in the accommodation space, and a second area disposed on an outside of the accommodation space, wherein the air gaps may be formed in the second area.

The optical resin layer may include an optical body, and a plurality of total-reflection optics protruding from a surface of the optical body, the plurality of total-reflection optics integrally formed with the optical body, wherein the total-reflection optic may be configured to guide the light emitted from the light source part in the optical body through internal total reflection.

When a direction facing the optical resin layer from the board part is defined as a first direction, a direction being perpendicular to the first direction, and in which the optical resin layer extends, may be defined as a second direction, and a direction being perpendicular to the first direction and the second direction may be defined as a third direction, wherein the optical body may include a front surface being a surface facing the first direction, a rear surface being a surface facing the board part, and a side surface provided between the front surface and the rear surface, wherein the total-reflection optic may include a plurality of front total-reflection optics formed on the front surface of the optical body, the plurality of front total-reflection optics formed to extend in the second direction or the third direction, and wherein the plurality of front total-reflection optics may be arranged to be spaced apart from each other in a direction crossing an extension direction of the front total-reflection optics.

The plurality of side total-reflection optics may be spaced apart from each other.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, embodiments of the present disclosure will be described in detail with reference to the attached drawings.

First, the embodiments described below are suitable embodiments for understanding the technical features of a lamp for a vehicle of the present disclosure. However, the present disclosure is not limited to the embodiments described below or the technical features of the present disclosure are limited by the embodiments described, and various modifications may be implemented within the technical scope of the present disclosure.

First Embodiment

Figure 1:
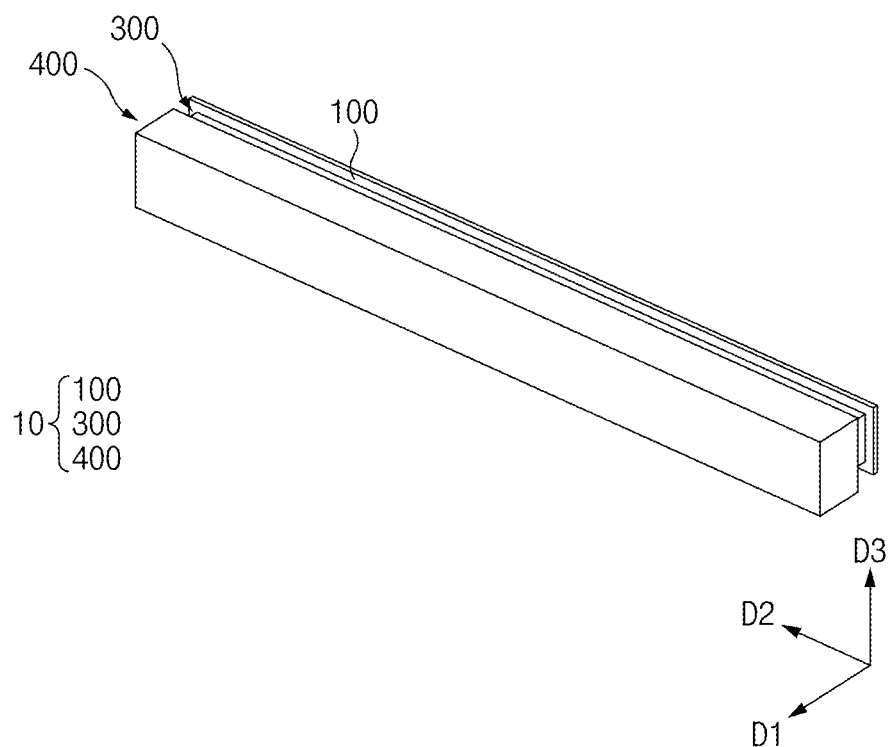
FIG. 1 is a perspective view illustrating a lamp for a vehicle according to a first embodiment of the present disclosure.
Figure 2:
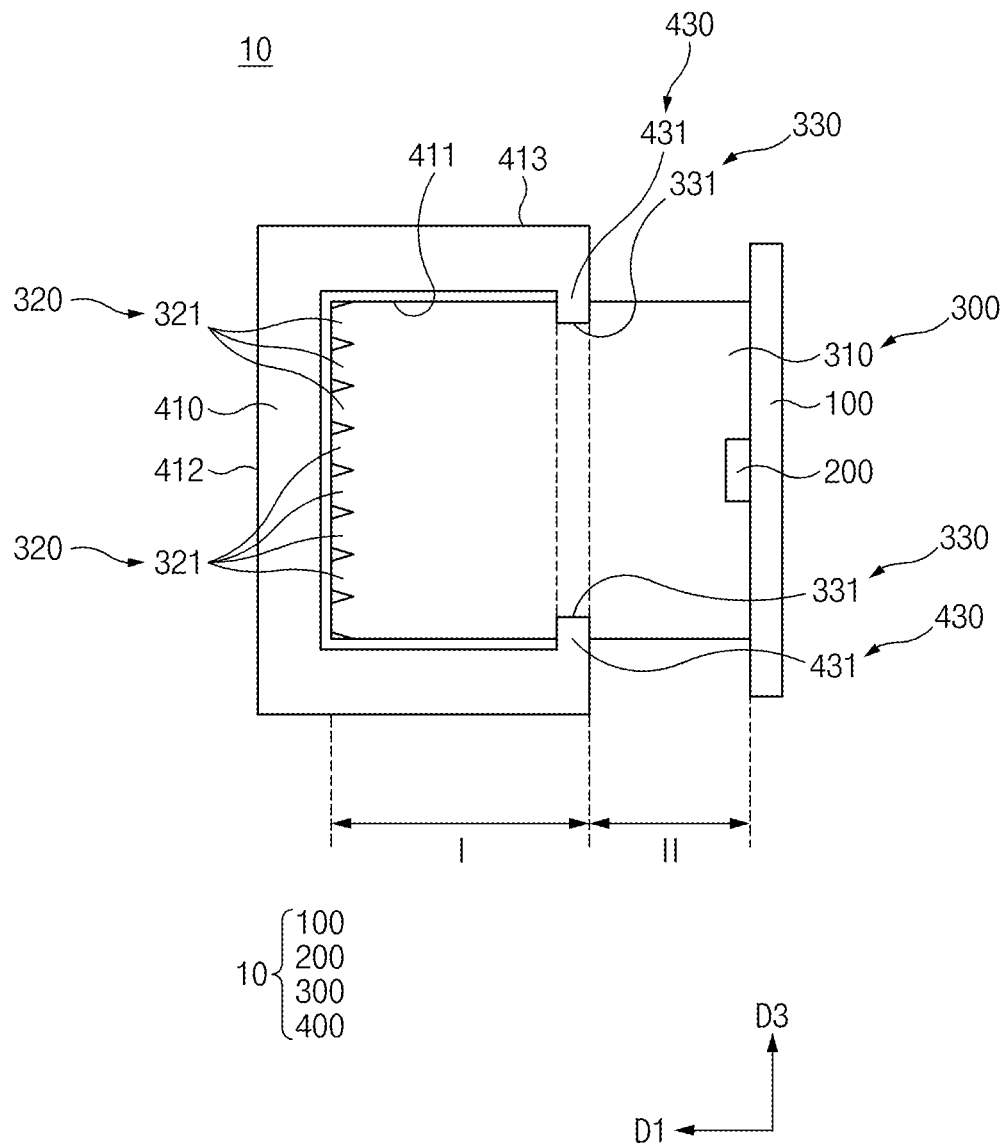
FIG. 2 is a cross-sectional view illustrating a cross-section of a lamp for a vehicle according to a first embodiment of the present disclosure.
Figure 3:
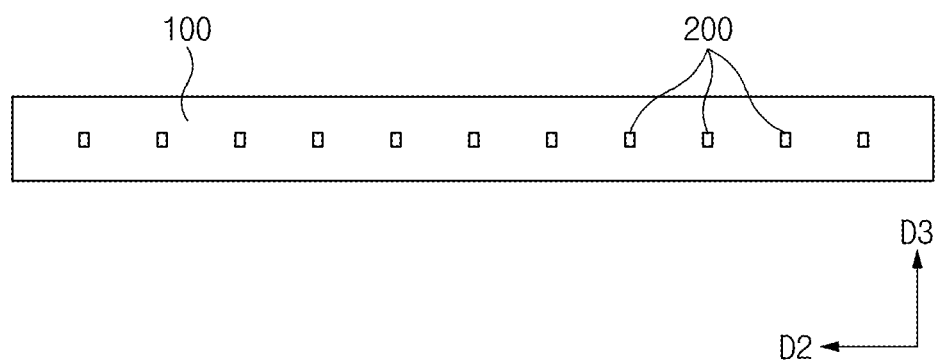
FIG. 3 is a front view illustrating a front surface of a board part according to a first embodiment of the present disclosure.
Figure 4:
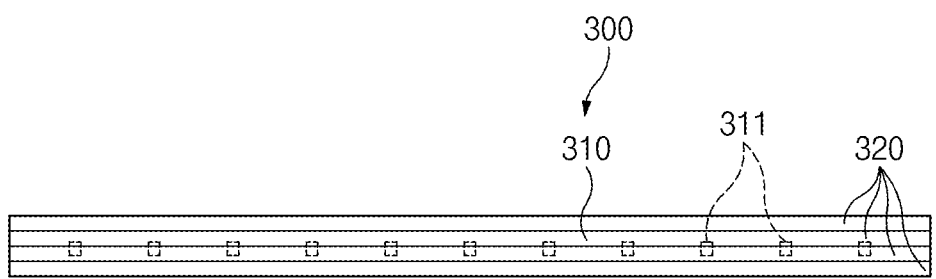
FIG. 4 is a front view illustrating a front surface of an optical resin layer according to a first embodiment of the present disclosure.
Figure 5:
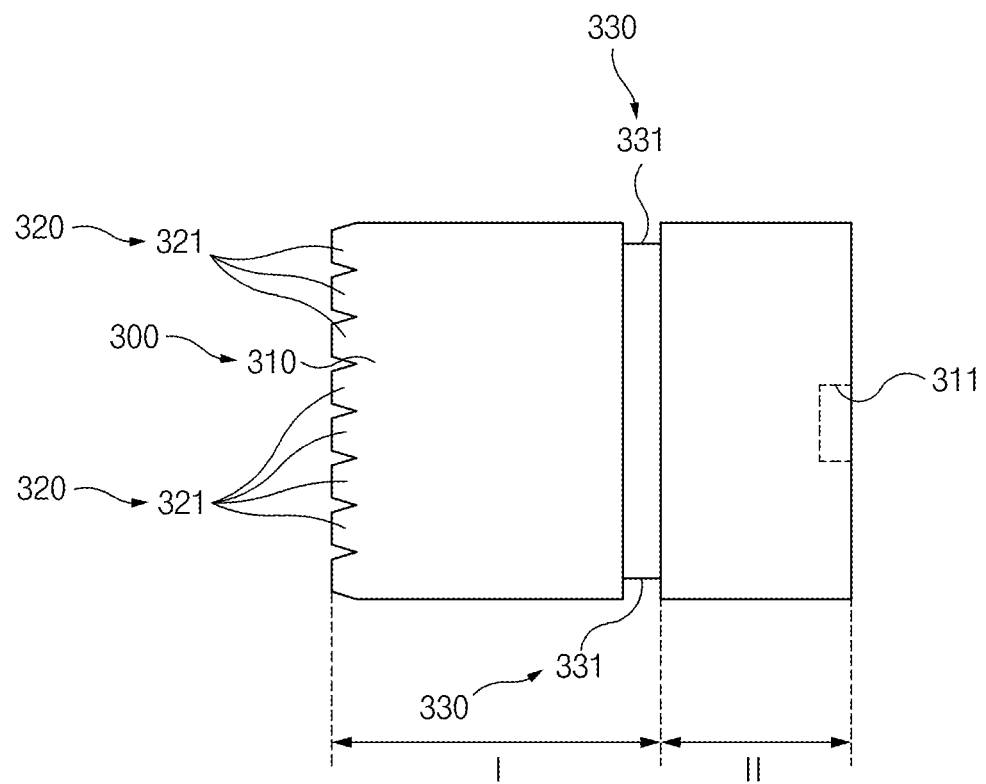
FIG. 5 is a side view illustrating a side surface of an optical resin layer according to a first embodiment of the present disclosure.

FIG. 1 is a perspective view illustrating a lamp for a vehicle according to a first embodiment of the present disclosure, FIG. 2 is a cross-sectional view illustrating a cross-section of a lamp for a vehicle according to a first embodiment of the present disclosure, FIG. 3 is a front view illustrating a front surface of a board part according to a first embodiment of the present disclosure, FIG. 4 is a front view illustrating a front surface of an optical resin layer according to a first embodiment of the present disclosure, and FIG. 5 is a side view illustrating a side surface of an optical resin layer according to a first embodiment of the present disclosure.

Hereinafter, a configuration of a first embodiment of the present disclosure will be described in detail with reference to FIGS. 1 to 5.

Referring to FIGS. 1 to 13, a lamp 10 for a vehicle according to an embodiment of the present disclosure includes a board part 100, a light source part, and an optical resin layer 300.

Hereinafter, for convenience of description, a direction that faces the optical resin layer 300 from the board part 100 is defined as a first direction D1, a direction that is perpendicular to the first direction D1, and in which the optical resin layer 300 extends, is defined as a second direction D2, and a direction that is perpendicular to the first direction D1 and the second direction D2 is defined as a third direction D3. Referring to the drawing illustrated in FIG. 1, the first direction D1 may be a forward direction of the lamp 10 for a vehicle, the second direction D2 may be a leftward/rightward direction, and the third direction D3 may be an upward/downward direction. However, the first direction D1 may not coincide with a traveling direction of the vehicle, and the second direction D2 and the third direction D3 may not coincide with the leftward/rightward direction and the upward/downward direction of the vehicle depending on installation of the lamp 10 for a vehicle.

The board part 100 may be formed to extend in one direction. For example, the board part 100 may extend in the second direction D2, and may be a printed circuit board (PCB).

The light source part includes a plurality of light sources 200 that are mounted on a front surface of the board part 100.

Specifically, the light source 200 is a component that generates and emits light, and various elements or devices that may emit light may be used. For example, the light source 200 may be a light emitting diode (LED).

A plurality of light sources 200 may be installed on a front surface of the board part 100 to be spaced apart from each other along the second direction D2. However, the disposition of a plurality of light sources 200 is not limited thereto, and may be variously changed according to a design specification of the lamp 10 for a vehicle.

The optical resin layer 300 is provided on a front surface of the board part 100, and is configured to cover the plurality of light sources 200.

Specifically, the optical resin layer 300 may be a configuration for protecting the light source part from an external impact and securing a uniformity of light emitted from the plurality of light sources 200 as well. Furthermore, the optical resin layer 300 may serve as a light guide that guides light emitted from the plurality of light sources 200 such that the light is emitted forward.

For example, the optical resin layer 300 may include a silicon resin composition. Specifically, the optical resin layer 300 may be formed by molding a silicon resin. Accordingly, the optical resin layer 300 may have excellent heat resistance, chemical resistance, and mechanical properties.

The optical resin layer 300 includes an optical body 310 and a first total-reflection optic 320.

The optical body 310 forms a body of the optical resin layer 300, and the light emitted from the light source 200 may be input thereto. A surface of the optical body 310 may include a front surface that faces the first direction D1, a rear surface that faces the board part 100, and a side surface between the front surface and the rear surface. The optical body 310 may extend in the second direction D2 to correspond to the board part 100.

Furthermore, a light source accommodating part 311, in which the light source 200 is accommodated, may be formed in the optical body 310. The number and the position of the light source accommodating part 311 may be formed to correspond to the number and the position of the light source 200.

The first total-reflection optic 320 protrudes from the surface of the optical body 310 and is integrally formed with the optical body 310, and is configured to totally reflect the light emitted from the light source part to guide it to the front surface of the optical body 310, and is provided in plural.

The first total-reflection optic 320 is a member that is formed on the surface of the optical body 310 to increase an optical efficiency of the lamp 10 for a vehicle through total internal reflection and to realize a uniform surface light emission image. Specifically, the first total-reflection optic 320 may be formed on the surface of the optical body 310, and may be formed on at least the front surface in the surface.

Light that is input to the optical body 310 and reaches the first total-reflection optic 320 may be reflected into the optical body 310 through total internal reflection, and may be guided forward or guided forward through re-reflection such that the light is emitted forward. Accordingly, according to the present disclosure, an optical efficiency may be increased, and thus, a high-luminosity surface-emission image may be implemented.

Furthermore, the first total-reflection optic 320 according to an embodiment of the present disclosure may be integrally formed with the optical body 310. Specifically, in an embodiment of the present disclosure, when the optical body 310 is manufactured, the first total-reflection optic 320 is formed together as previously designed on the surface of the optical body 310, so that the optical body 310 and the first total-reflection optic 320 may be integrally formed.

In an embodiment of the present disclosure, because the first total-reflection optic 320 is integrally formed with the optical body 310, an additional process or a separate lens for realizing uniform surface light emission may not be required.

In this way, according to an embodiment of the present disclosure, the first total-reflection optic 320 is integrally formed on the surface of the optical body 310, so that an optical efficiency and an optical uniformity may be improved whereby a high-luminosity surface light emission image may be implemented.

Furthermore, according to an embodiment of the present disclosure, because the first total-reflection optic 320 has an integral structure with the optical body 310, no additional process or separate lens is required, so that productivity is improved and it is advantageous in terms of costs.

The first total-reflection optic 320 may be formed on a front surface or a side surface of the optical body 310.

Specifically, referring to the embodiments illustrated in FIGS. 1 to 5, the first total-reflection optic 320 may include a front total-reflection optic 321.

The front total-reflection optic 321 may be formed on the front surface of the optical body 310, and may be formed to extend in the second direction D2 or the third direction D3. Furthermore, a plurality of front total-reflection optics 321 may be provided, and may be arranged to be spaced apart from each other in a direction that crosses an extension direction of the plurality of front total-reflection optics 321.

For example, the front total-reflection optics 321 may be formed to extend in the second direction D2, as in the embodiment illustrated in FIGS. 2, 4 and 5. The plurality of front total-reflection optics 321 may be arranged to be spaced apart from each other in the third direction D3 that is a direction that crosses the second direction D2.

However, the extension direction and the arrangement direction of the front total-reflection optics 321 are not limited to the above description, and may be formed in various directions. For example, the front total-reflection optics 321 may extend in the third direction D3, and the plurality of front total-reflection optics 321 may be arranged to be spaced apart from each other in the second direction D2. Furthermore, the front total-reflection optics 321 may be formed to extend in a direction other than the second direction D2 or the third direction D3.

As described above, in an embodiment of the present disclosure, the plurality of front total-reflection optics 321 are continuously arranged along one direction, so that light may cause a plurality of total internal reflections in the optical body 310 and thus, an optical uniformity may be further improved.

Meanwhile, referring to the embodiments illustrated in FIGS. 6 to 9, the first total-reflection optic 320 may include a side total-reflection optic 322.

The side total-reflection optic 322 may be formed on the side surface of the optical body 310, and may be formed to extend in the first direction D1 or the second direction D2. Furthermore, a plurality of side total-reflection optics 322 may be provided, and may be arranged to be spaced apart from each other to cross an extension direction of the plurality of side total-reflection optic 322.

For example, the side total-reflection optics 322 may be formed on one side and an opposite side of the optical body 310 in the third direction D3. Furthermore, the side total-reflection optics 322 may be formed to extend in the first direction D1, and the plurality of side total-reflection optics 322 may be arranged to be spaced apart from each other along the second direction D2 that is a direction that crosses the extending direction.

Figure 8:
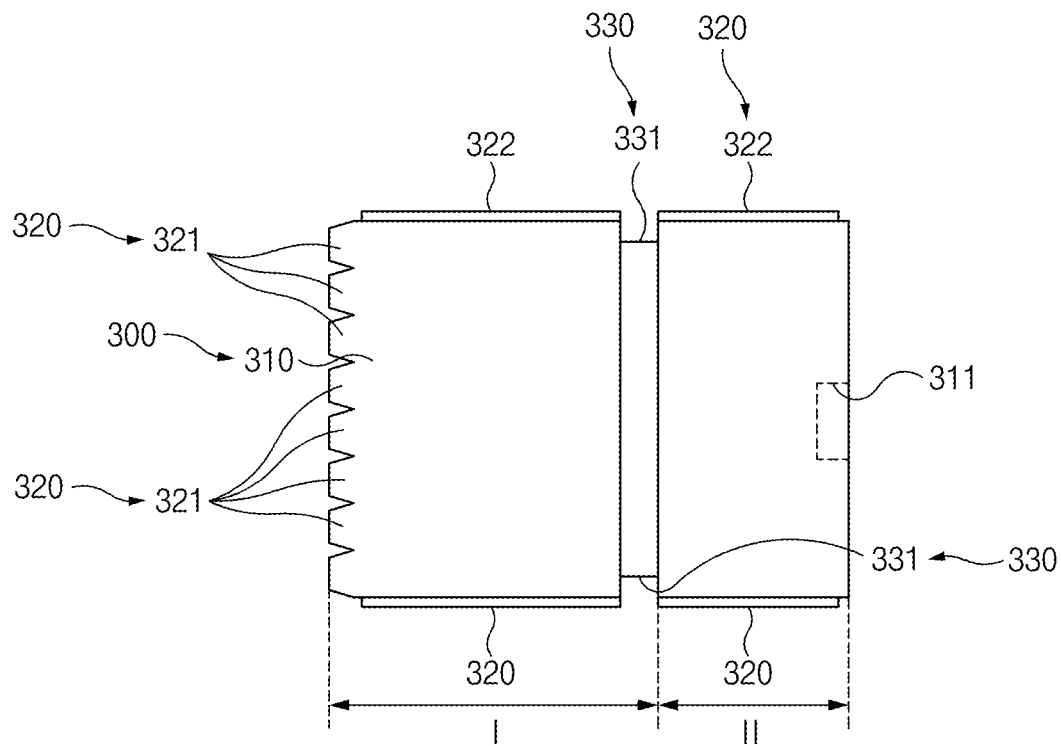
FIG. 8 is a view illustrating a side surface of an optical resin layer according to a second embodiment of the present disclosure.

In other words, referring to FIGS. 5 and 8, the side total-reflection optics 322 may protrude from an upper surface and a lower surface of the optical body 310. The side total-reflection optics 322 may extend in the forward/rearward direction, and the plurality of side total-reflection optic 322 may be repeatedly arranged to be spaced apart from each other in the leftward/rightward direction.

Accordingly, the side total-reflection optics 322 may be formed to extend in a different direction (e.g., a crossing direction) from the front total-reflection optic 321, and may be arranged in different directions. Accordingly, even when light is emitted from the light source part at various angles, it is possible to induce total reflection in an interior of the optical resin layer 300.

Then, the plurality of side total-reflection optics 322 may be repeatedly arranged in the same shape while being formed at regular intervals. Accordingly, the optical uniformity of the lamp for a vehicle may be further improved.

In addition to the front total-reflection optic 321, the optical resin layer 300 according to an embodiment of the present disclosure further includes a side total-reflection optic 322, and the side total-reflection optic 322 may be arranged in a different direction from the front total-reflection optic 321 whereby the optical uniformity and the optical efficiency of the lamp 10 for a vehicle may be further improved.

Meanwhile, as described above, the shape of the first total-reflection optic 320 may be formed in a bar shape that extends in the first direction D1 or the second direction D2. That is, the first total-reflection optic 320 may be formed to have the same cross section along the extension direction.

In the first total-reflection optic 320, a cross-sectional shape in a direction that is perpendicular to the extension direction of the first total-reflection optic 320 may be formed in an arc shape or a polygonal shape.

For example, referring to FIGS. 2, 5, 6, and 8, in the front total-reflection optic 321, a cross-sectional shape in a direction that is perpendicular to the second direction D2 that is an extension direction may be formed in a trapezoidal shape. Furthermore, the plurality of front total-reflection optic 321 may be formed in the same cross-sectional shape.

Figure 6:
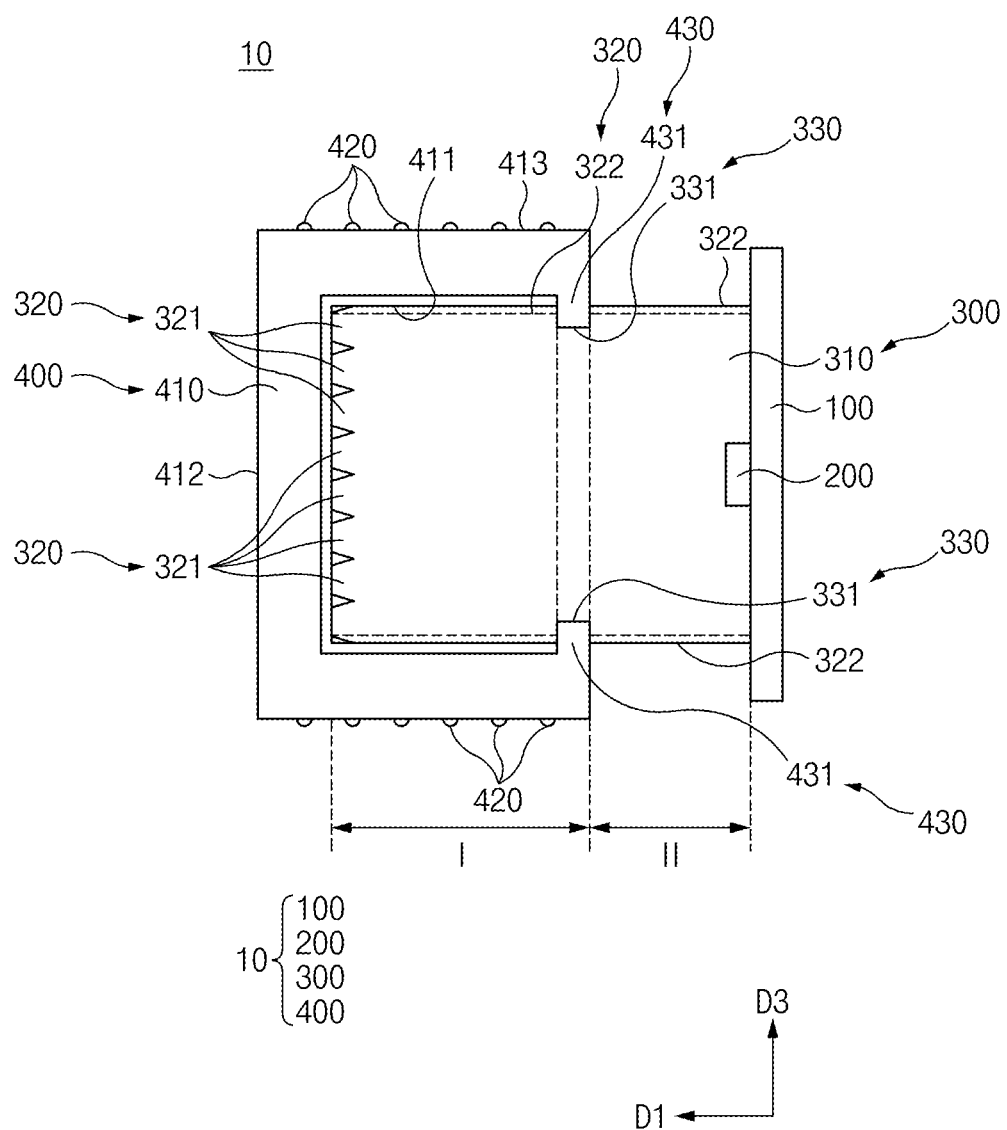
FIG. 6 is a cross-sectional view illustrating a lamp for a vehicle according to a second embodiment of the present disclosure.
Figure 7:
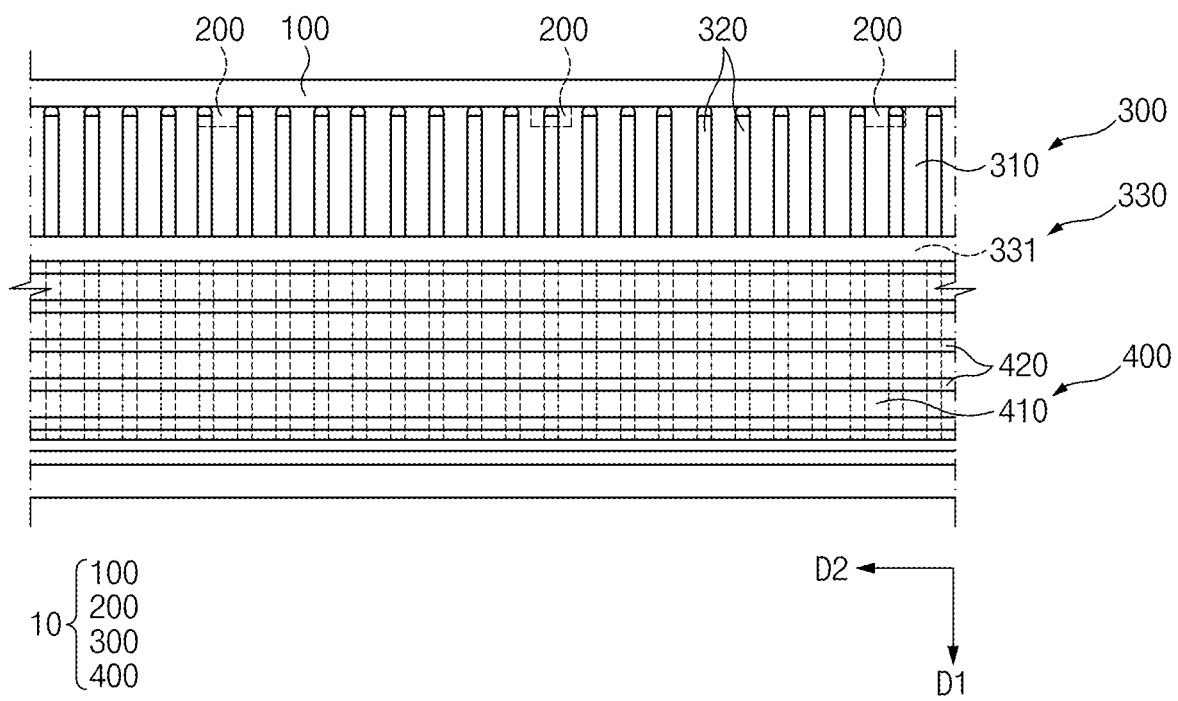
FIG. 7 illustrates a lamp for a vehicle according to a second embodiment of the present disclosure, and is a top view illustrating an upper surface of FIG. 6.
Figure 9:
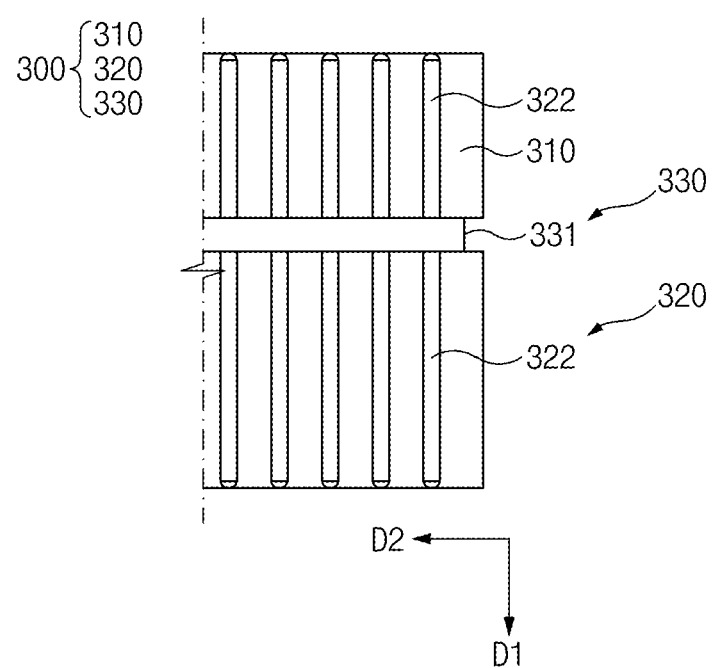
FIG. 9 is a top view illustrating an upper surface of an optical resin layer illustrated in FIG. 8.

Furthermore, for example, referring to FIGS. 6, 7, and 9, in the side total-reflection optic 322, a cross-sectional shape in a direction that is perpendicular to the first direction D1 may be formed in an arc or semicircular shape. Furthermore, the plurality of side total-reflection optic 322 may be formed in the same cross-sectional shape.

In this way, the plurality of side total-reflection optics 322 and the plurality of front total-reflection optics 321 are formed in a bar shape that extends in one direction, are provided in plural, and formed in the same shape whereby a uniformity may be secured and an optical efficiency may be increased compared to when they are formed in a matrix type or an uneven shape.

However, the shapes of the front total-reflection optic 321 and the side total-reflection optic 322 are not limited to the illustrated embodiment, and may be modified in various shapes as long as they may be formed in a bar shape.

Meanwhile, an embodiment of the present disclosure may further include an outer lens 400 that is provided on the front surface of the optical resin layer 300.

The outer lens 400 may include a lens body 410 and a fixing part 430.

The lens body 410 defines the body of the outer lens 400, and an accommodation space 411, in which at least a partial area of the optical body 310 in the first direction D1 may be accommodated, and which is opened toward the board part 100 may be formed.

The optical resin layer 300 may be entirely accommodated in the accommodation space 411 of the lens body 410, or a partial area including the front surface of the optical resin layer 300 may be accommodated therein. In the illustrated embodiment, a partial area of the optical resin layer 300 may be covered by the lens body 410. When a partial area of the optical resin layer 300 is accommodated in the lens body 410, the optical resin layer 300 may include a first area "I" that is accommodated in the accommodation space 411, and a second area II that is disposed outside the accommodation space 411.

The fixing part 430 may be formed in the lens body 410 and may be formed to be assembled with the optical resin layer 300. Furthermore, the optical resin layer 300 may further include an assembly part 330 that is configured to correspond to the fixing part 430. Here, there is no limitation on the shape and the assembly method of the fixing part 430 and the assembly part 330, and various methods may be applied as long as the optical resin layer 300 and the outer lens 400 may be assembled.

For example, the fixing part 430 and the assembly part 330 may be formed at a point, at which the first area "I" and the second area II meet each other. However, the positions of the fixing part 430 and the assembly part 330 are not limited thereto.

Figure 13:
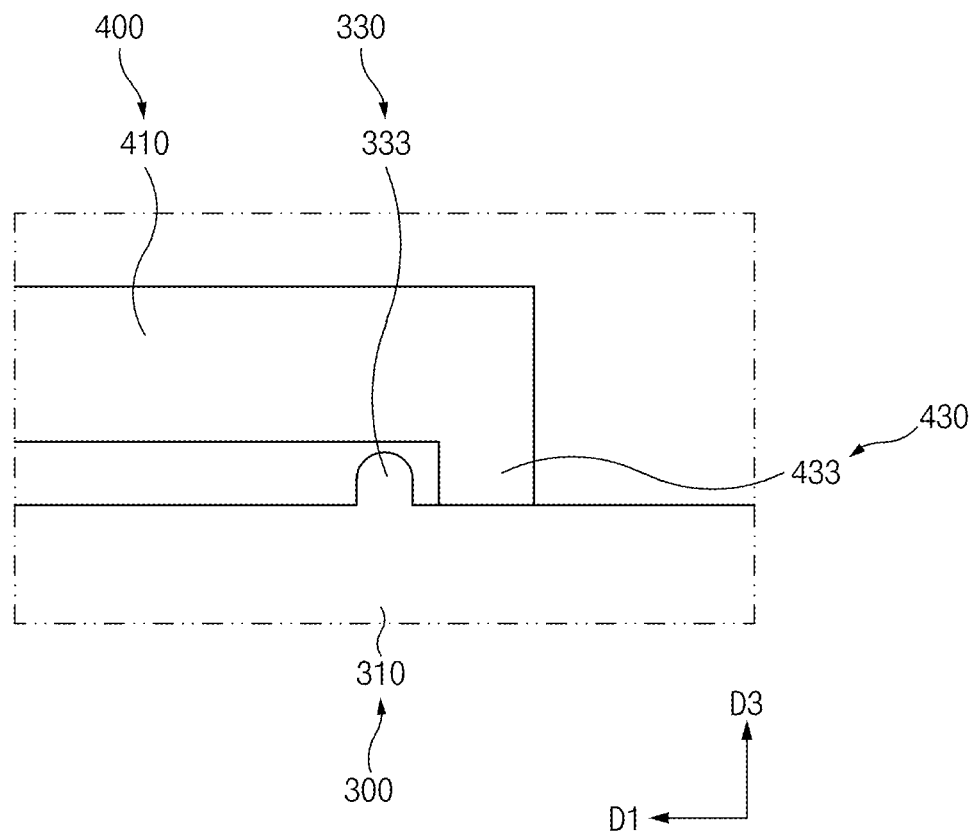
FIG. 13 is a view illustrating a modification of a lamp for a vehicle according to a second embodiment of the present disclosure, and is an enlarged cross-sectional view illustrating an assembly part and a fixing part.

In FIGS. 2 and 5 to 9, an example of the assembly part 330 and the fixing part 430 according to the present disclosure is illustrated, and in FIG. 13, another example of the assembly part 330 and the fixing part 430 according to the present disclosure is illustrated. However, the fixing part 430 and the assembly part 330 are not limited to an example that is different from the illustrated example.

Referring to FIGS. 2 and 5 to 9, the assembly part 330 may include an assembly groove 331 that is formed on the side surface of the optical body 310 to be concave.

Furthermore, the fixing part 430 may include a fixing boss 431 that is formed at a rear end of the lens body 410 and protruding toward the accommodation space 411 to be inserted into the assembly groove 331.

Specifically, the optical resin layer 300 and the outer lens 400 may be assembled when the fixing boss 431 is inserted into the assembly groove 331 during assembly. The fixing boss 431 may be continuously formed along a circumference of an opening of the lens body 410, and may protrude toward the accommodation space 411. Furthermore, the assembly groove 331 may be formed at a circumference of the side surface of the optical body 310 to be concave to correspond to the shape of the fixing boss 431.

Meanwhile, referring to FIG. 13, the assembly part 330 may include an assembly boss 333 that protrudes from the side surface of the optical body 310.

Furthermore, the fixing part 430 may include a stop boss 433 formed to be stopped by the assembly boss 333 to prevent the outer lens 400 from deviating from the optical resin layer 300 in the first direction D1.

Specifically, the assembly boss 333 may be continuously formed along a circumference of an opening of the lens body 410, and may protrude toward the accommodation space 411. Furthermore, the stop boss 433 may be formed at a position corresponding to the position of the fixing boss 431, and may be formed to be convex along a circumference of the side surface of the optical body 310. The fixing boss 431 and the stop boss 433 may be formed continuously, but may be formed intermittently as long as they are formed at corresponding positions.

When the optical resin layer 300 and the outer lens 400 are assembled, the opening of the lens body 410 is elastically widened and thus, the stop boss 433 is moved to a rear side of the assembly boss 333, and when the stop boss 433 is located on a rear side of the assembly boss 333, the opening of the lens body 410 is restored to its original state, and the stop boss 433 is stopped by the assembly boss 333. Accordingly, the outer lens 400 may not be separated from the optical resin layer 300.

An assembly performance of the optical resin layer 300 and the outer lens 400 may be improved by the configurations of the assembly part 330 and the fixing part 430.

Second Embodiment

Figure 10:
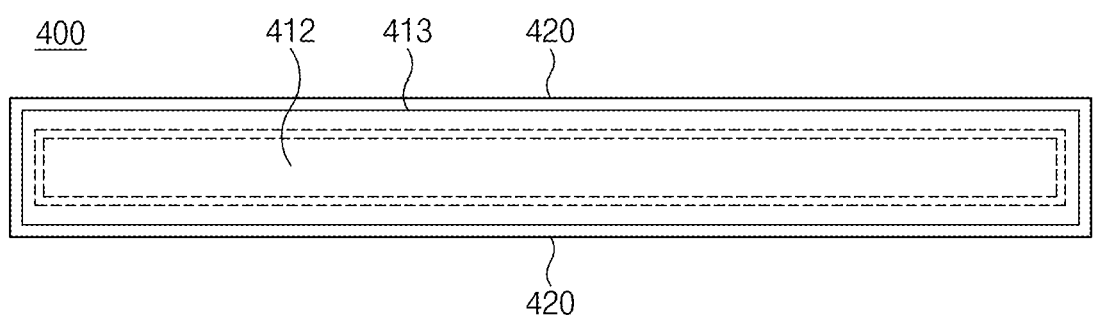
FIG. 10 illustrates an outer lens according to a second embodiment of the present disclosure, and is a front view illustrating a front surface of an outer lens.
Figure 11:
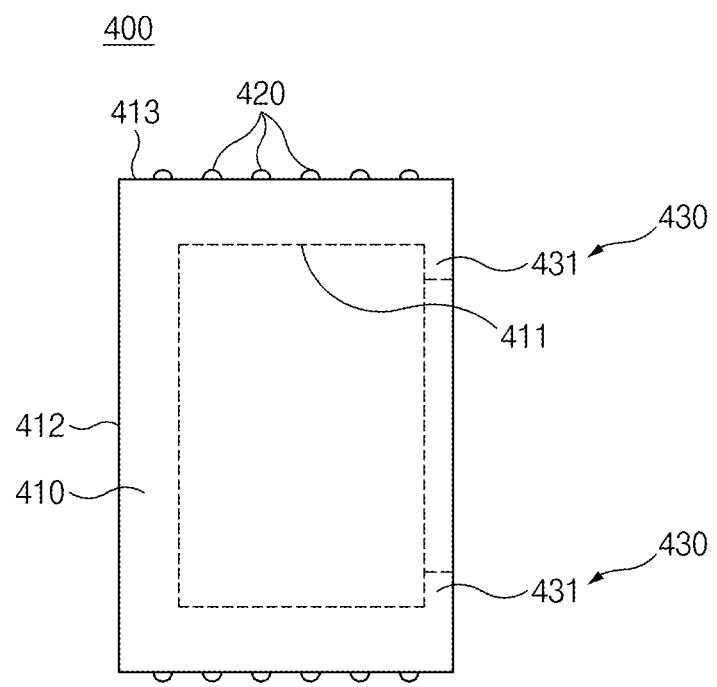
FIG. 11 illustrates an outer lens according to a second embodiment of the present disclosure, and is a side view illustrating a side surface of an outer lens.
Figure 12:
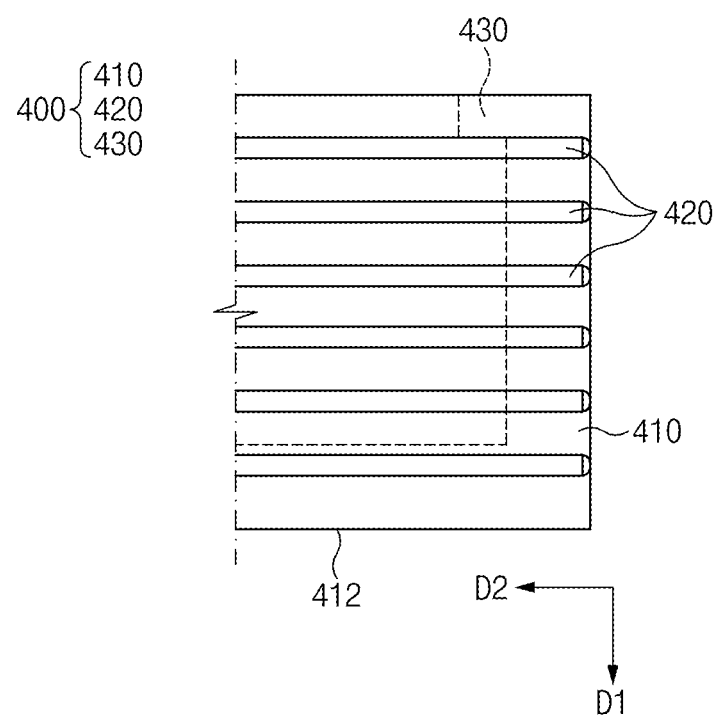
FIG. 12 is a view illustrating a portion of an upper surface of an outer lens illustrated in FIG. 11.

FIG. 6 is a cross-sectional view illustrating a lamp for a vehicle according to a second embodiment of the present disclosure, FIG. 7 illustrates a lamp for a vehicle according to a second embodiment of the present disclosure, and is a top view illustrating an upper surface of FIG. 6, FIG. 8 is a view illustrating a side surface of an optical resin layer according to a second embodiment of the present disclosure, FIG. 9 is a top view illustrating an upper surface of an optical resin layer illustrated in FIG. 8, FIG. 10 illustrates an outer lens according to a second embodiment of the present disclosure, and is a front view illustrating a front surface of an outer lens, FIG. 11 illustrates an outer lens according to a second embodiment of the present disclosure, and is a side view illustrating a side surface of an outer lens, FIG. 12 is a view illustrating a portion of an upper surface of an outer lens illustrated in FIG. 11, and FIG. 13 is a view illustrating a modification of a lamp for a vehicle according to a second embodiment of the present disclosure, and is an enlarged cross-sectional view illustrating an assembly part and a fixing part.

The second embodiment of the present disclosure illustrated in FIGS. 6 to 12 differs from the first embodiment of the present disclosure illustrated in FIGS. 1 to 5 in that the first total-reflection optic 320 further includes a side total-reflection optic 322, and the outer lens 400 further includes a second total-reflection optic 420. A modification of the present disclosure illustrated in FIG. 13 illustrates a modification of the assembly part 330 and the fixing part 430 of the first and second embodiments of the present disclosure.

Except for these differences, the second embodiment and the modification of the first embodiment of the present disclosure may include all the configurations of the first embodiment of the present disclosure.

Meanwhile, according to the second embodiment of the present disclosure illustrated in FIGS. 6 to 12, the outer lens 400 may further include a second total-reflection optic 420.

The second total-reflection optic 420 may be integrally formed on at least one of a front surface 412 and a side surface 413 of the lens body 410, and may be provided in plural. The second total-reflection optic 420 may be provided to guide light emitted from the optical resin layer 300 through total internal reflection.

Specifically, the second total-reflection optic 420 is configuration for improving the optical efficiency and uniformity by guiding light through total internal reflection, together with the first total-reflection optic 320 formed in the optical resin layer 300. Most of the light emitted from the light source part and input to the optical resin layer 300 may be output forward by direct light or total internal reflection. Furthermore, some of the light input to the optical resin layer 300 may pass through the optical resin layer 300 and reach the outer lens 400.

The second total-reflection optic 420 provided in the outer lens 400 may guide light input from the optical resin layer 300 forward through total internal reflection. Accordingly, the optical efficiency of the lamp 10 for a vehicle may be improved.

The lens body 410 may include a front surface 412 and a plurality of side surfaces 413. The second total-reflection optic 420 may be formed on the front surface 412 or the side surface 413 of the lens body 410, or may be formed on both the front surface 412 and the side surface 413. For example, as in the illustrated embodiment, the second total-reflection optic 420 may be formed on the side surface 413 of the lens body 410, that is, one surface and an opposite surface in the third direction D3. However, the position of the second total-reflection optic 420 is not limited thereto, and may also be formed on the front surface 412 of the lens body 410.

For example, the second total-reflection optic 420 may extend in a direction that crosses a direction, in which the first total-reflection optic 320 extends. Furthermore, a plurality of second total-reflection optic 420 may be provided, and the plurality of second total-reflection optic 420 may be arranged to be spaced apart from each other in a direction that crosses a direction, in which the second total-reflection optic 420 extends.

For example, as in the illustrated embodiment, when the second total-reflection optic 420 is formed on an upper surface and a lower surface of the lens body 410, and in the first total-reflection optic 320, the side surface total-reflection optics 322 formed on an upper surface and a lower surface of the optical body 310 extends in the first direction D1, the second total-reflection optic 420 may be formed to extend in the second direction D2. Furthermore, in this case, a plurality of second total-reflection optics 420 may be arranged to be spaced apart from each other in a direction (e.g., the first direction D1) that crosses the second direction D2.

In this way, because the extension direction and the arrangement direction of the second total-reflection optics 420 are formed at positions that cross the extension direction and the arrangement direction of the first total-reflection optic 320 formed at an overlapping position, light emitted in various directions may be guided forward through total internal reflection. Accordingly, when the second total-reflection optic 420 is formed in the outer lens 400 as in the second embodiment of the present disclosure, an optical efficiency and an optical uniformity may be further improved compared to the first embodiment of the present disclosure, in which the first total-reflection optic 320 is formed only in the optical resin layer 300.

Third Embodiment

Meanwhile, in FIGS. 14 to 21, a third embodiment of the present disclosure is illustrated.

Figure 14:
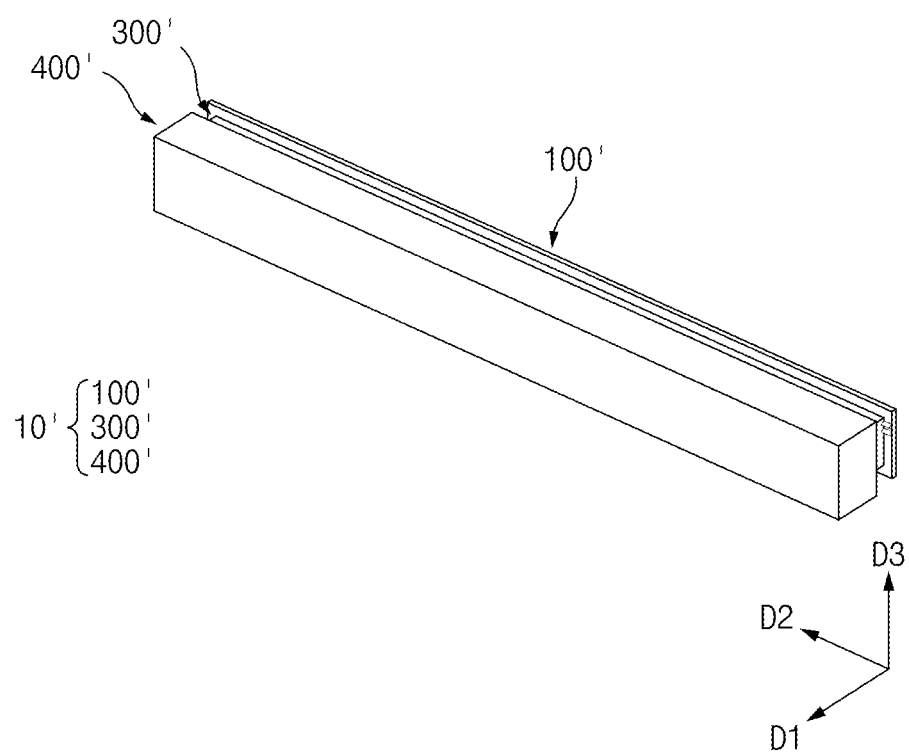
FIG. 14 is a perspective view illustrating a lamp for a vehicle according to a third embodiment of the present disclosure.
Figure 15:
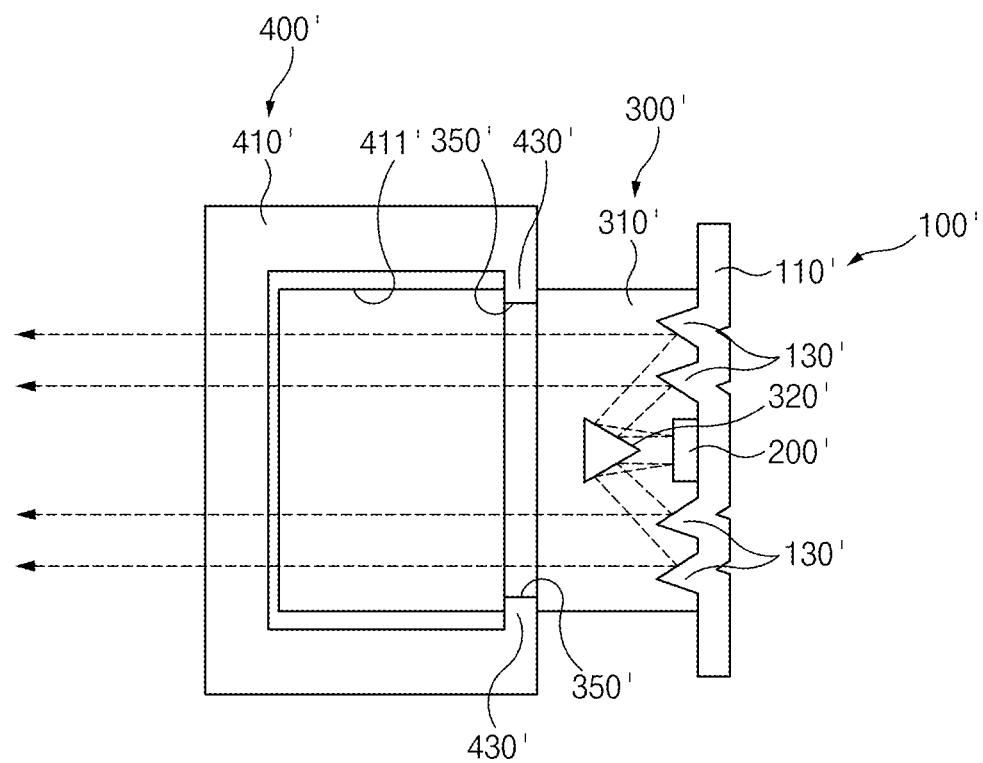
FIG. 15 is a cross-sectional view illustrating a cross-section of a lamp for a vehicle according to a third embodiment of the present disclosure.
Figure 15:
Figure 16:
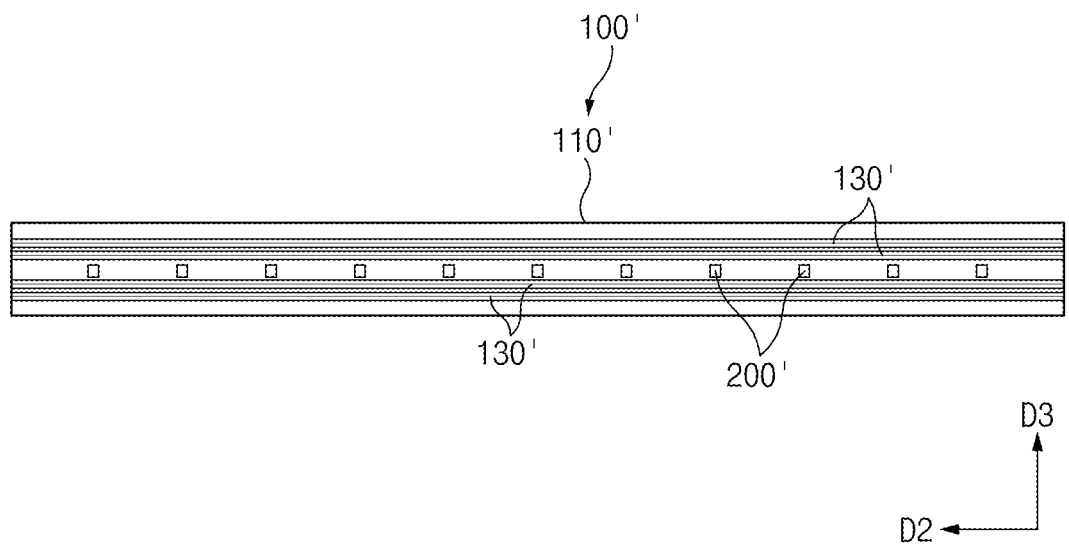
FIG. 16 is a front view illustrating a front surface of a board part according to a third embodiment of the present disclosure.
Figure 17:
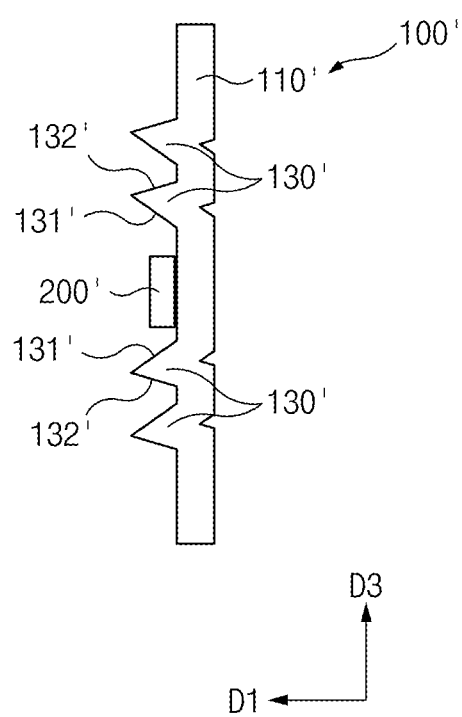
FIG. 17 is a cross-sectional view illustrating a side cross-section of a board part according to a third embodiment of the present disclosure.
Figure 18:
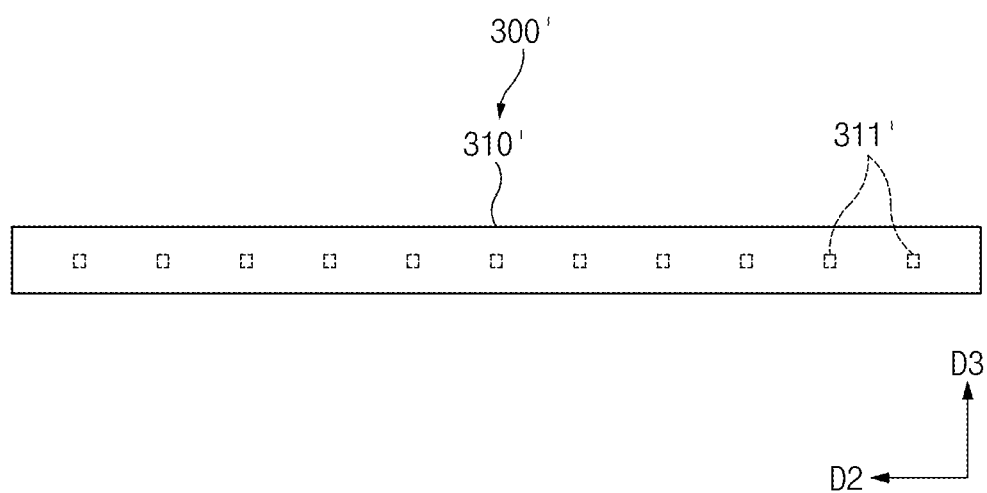
FIG. 18 is a front view illustrating a front surface of an optical resin layer according to a third embodiment of the present disclosure.
Figure 19:
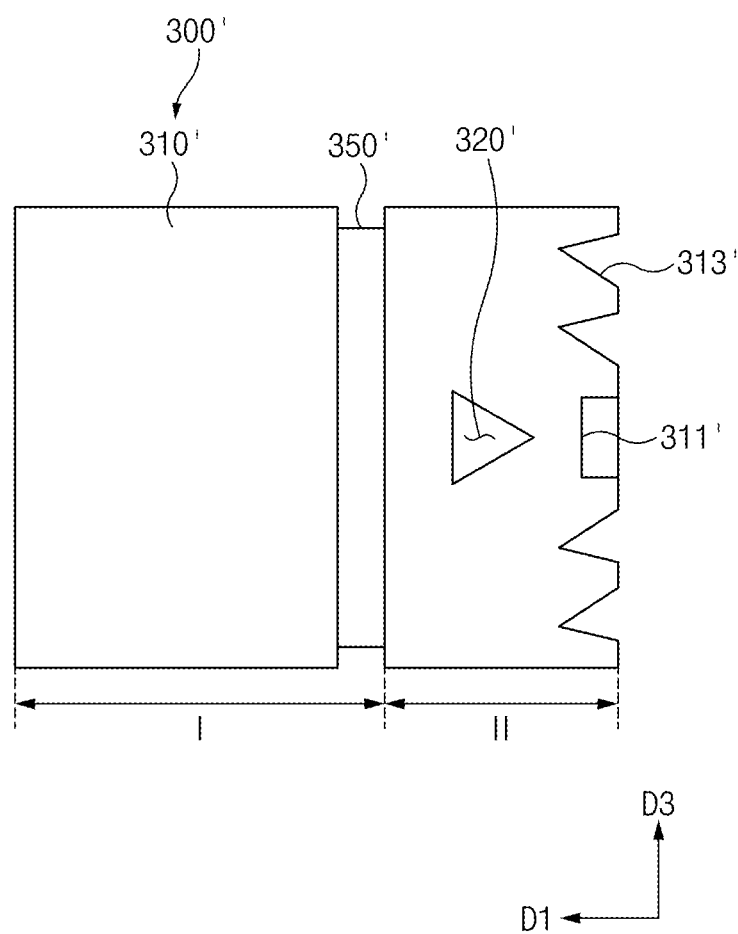
FIG. 19 is a cross-sectional view illustrating a cross-section of an optical resin layer according to a third embodiment of the present disclosure.
Figure 20:
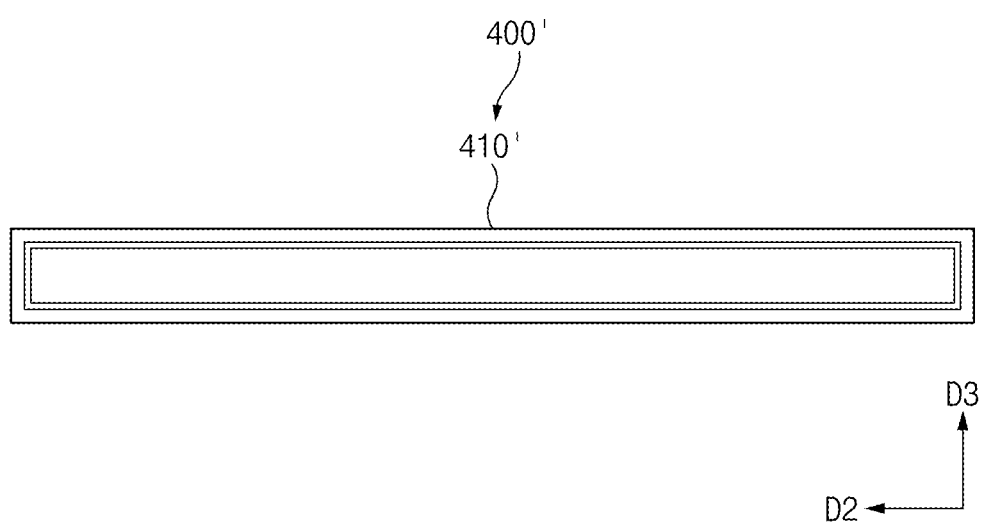
FIG. 20 is a front view illustrating a front surface of an outer lens according to a third embodiment of the present disclosure.
Figure 21:
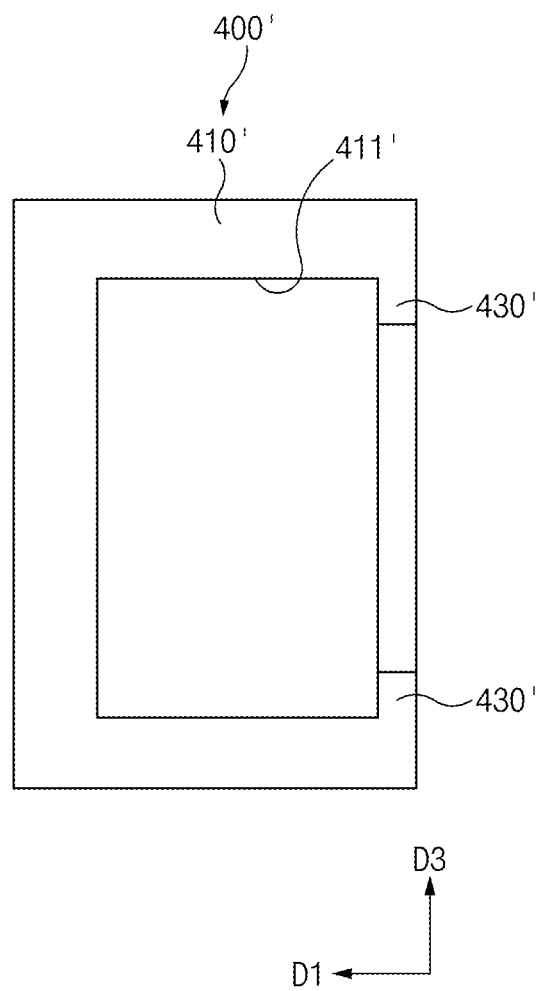
FIG. 21 is a side view illustrating a side surface of an outer lens according to a third embodiment of the present disclosure.

FIG. 14 is a perspective view illustrating a lamp for a vehicle according to a third embodiment of the present disclosure, FIG. 15 is a cross-sectional view illustrating a cross-section of a lamp for a vehicle according to a third embodiment of the present disclosure, FIG. 16 is a front view illustrating a front surface of a board part according to a third embodiment of the present disclosure, FIG. 17 is a cross-sectional view illustrating a side cross-section of a board part according to a third embodiment of the present disclosure, FIG. 18 is a front view illustrating a front surface of an optical resin layer according to a third embodiment of the present disclosure, FIG. 19 is a cross-sectional view illustrating a cross-section of an optical resin layer according to a third embodiment of the present disclosure, FIG. 20 is a front view illustrating a front surface of an outer lens according to a third embodiment of the present disclosure, and FIG. 21 is a side view illustrating a side surface of an outer lens according to a third embodiment of the present disclosure.

Referring to FIGS. 14 to 21, a lamp 10' for a vehicle according to an embodiment of the present disclosure includes a board part 100', a light source part, and an optical resin layer 300'.

Hereinafter, for convenience of description, a direction that faces the optical resin layer 300' from the board part 100' is defined as a first direction D1', a direction that is perpendicular to the first direction D1', and in which the optical resin layer 300' extends, is defined as a second direction D2', and a direction that is perpendicular to the first direction D1' and the second direction D2' is defined as a third direction D3'. Referring to the drawing illustrated in FIG. 14, the first direction D1' may be a forward direction of the lamp 10' for a vehicle, the second direction D2' may be a leftward/rightward direction, and the third direction D3' may be an upward/downward direction. However, the first direction D1' may not coincide with a traveling direction of the vehicle, and the second direction D2' and the third direction D3' may not coincide with the leftward/rightward direction and the upward/downward direction of the vehicle depending on installation of the lamp 10' for a vehicle.

The board part 100' may be formed to extend in one direction. For example, the board part 100' may extend in the second direction D2', and may be a printed circuit board (PCB).

The light source part includes a plurality of light sources 200' that are mounted on a front surface of the board part 100'.

Specifically, the light source 200' is a component that generates and emits light, and various elements or devices that may emit light may be used. For example, the light source 200' may be a light emitting diode (LED).

A plurality of light sources 200' may be installed on a front surface of the board part 100' to be spaced apart from each other along the second direction D2'. However, the disposition of a plurality of light sources 200' is not limited thereto, and may be variously changed according to a design specification of the lamp 10' for a vehicle.

The optical resin layer 300' is provided on a front surface of the board part 100', and is configured to cover the plurality of light sources 200'.

Specifically, the optical resin layer 300' may be a configuration for protecting the light source part from an external impact and securing a uniformity of light emitted from the plurality of light sources 200' as well. Furthermore, the optical resin layer 300' may serve as a light guide that guides light emitted from the plurality of light sources 200' such that the light is emitted forward.

For example, the optical resin layer 300' may include a silicon resin composition. Specifically, the optical resin layer 300' may be formed by molding a silicon resin. Accordingly, the optical resin layer 300' may have excellent heat resistance, chemical resistance, and mechanical properties.

The optical resin layer 300' may include an optical body 310'. The optical body 310' forms a body of the optical resin layer 300', and the light emitted from the light source 200' may be input thereto. A surface of the optical body 310' may include a front surface that faces the first direction D1', a rear surface that faces the board part 100', and a side surface between the front surface and the rear surface. The optical body 310' may extend in the second direction D2' to correspond to the board part 100'.

A light source accommodating part 311', in which the light source 200' is accommodated, may be formed in the optical body 310'. The number and the position of the light source accommodating part 311' may be formed to correspond to the number and the position of the light source 200'.

Meanwhile, referring to FIGS. 15 to 17, the board part 100' may include a board 110' and a reflective boss 130'. The reflective boss 130' may protrude from the front surface of the board 110' and may be provided in plural to reflect light emitted from the light source part forward.

Specifically, the reflective boss 130' may be formed in various shapes on the front surface of the board part 100'. For example, the reflective boss 130' may be formed by providing the board 110' with an appearance by pressing the board 110'. The reflective boss 130' may be made to protrude from the front surface while pressing it in a direction that faces the front surface from the rear surface of the board 110'.

However, a method of forming the reflective boss 130' is not limited to press molding, and various methods may be applied as long as the reflective boss 130' may be formed on the front surface of the board 110'.

The light that is emitted from the light source or the light that is emitted from the light source, travels forward, and then is reflected back to the rear side may reach the reflective boss 130', causing scattering, and thus, the light may be reflected again forward. In this way, the reflective boss 130' may increase the optical efficiency of the lamp for a vehicle by reflecting the light that has traveled rearward or the light reflected rearward to the front side.

Furthermore, a plurality of reflective bosses 130' may be provided to further increase scattering of light, and thus, the optical uniformity may be increased.

Accordingly, according to an embodiment of the present disclosure, because the optical efficiency may be increased and the light uniformity may be improved as well, a high-luminosity surface light-emission lighting image may be implemented in the lamp for a vehicle.

Furthermore, according to an embodiment of the present disclosure, because the reflective boss 130' is formed in an integral structure through press molding when the board part 100' is manufactured, no additional process or separate lens is required, whereby productivity may be improved and it may be advantageous in terms of costs.

Meanwhile, the optical resin layer 300' may further include a boss accommodating part 313'. The boss accommodating part 313' may be formed to correspond to the reflective boss 130' and may be formed in plural on the optical body 310' to accommodate the plurality of reflective bosses 130'.

Here, the position, the shape, and the number of the boss accommodating parts 313' may be formed to correspond to the position, the shape and the number of the reflective bosses 130'. By forming the boss accommodating part 313' in the optical resin layer 300', the board 110' and the reflective boss 130' of the board 110' may be protected.

Meanwhile, the reflective boss 130' may be formed in a convex curved shape or a polygonal column shape.

Furthermore, for example, the reflective boss 130' may have a width in the second direction that is greater than a width in the third direction. That is, the reflective boss 130' may be formed to extend long along the second direction. More specifically, a cross-sectional shape of the reflective boss 130' in a direction that is perpendicular to the second direction may be formed in an arc shape or a polygonal shape.

In the illustrated embodiment, it is illustrated that the cross-sectional shape of the reflective boss 130' is a triangular shape. Here, the cross-sectional shape of the reflective boss 130' may be formed in the same shape along the second direction. However, the shape of the reflective boss 130' is not limited to the illustrated embodiment. For example, a cross-section of the reflective boss 130' in a direction perpendicular to the second direction may be formed in various shapes, such as an arc shape, a rectangular shape, and the like.

Furthermore, referring to FIG. 17, a cross-sectional shape of the reflective boss 130' in a direction that is perpendicular to the second direction may be formed in a triangular shape, and the reflective boss 130' may include a reflective surface 131' and an inclined surface 132'.

The reflective surface 131' may be formed to face the light source part, and may be configured to reflect the light emitted from the light source part. Furthermore, the inclined surface 132' may be provided in a direction that is opposite to a direction of the reflective surface 131', which faces the light source part.

Specifically, among the protruding surfaces of the reflective boss 130', a surface that faces the light source part may be referred to as a reflective surface 131', and a surface opposite to the direction that faces the light source part may be referred to as an inclined surface 132'. Light emitted or reflected light from the light source 200' may be scattered and reflected after reaching the reflective surface 131'.

For example, on a cross section that is perpendicular to the second direction, a length of the reflective surface 131' may be formed to be larger than a length of the inclined surface 132'. Accordingly, an extent of a surface in a direction that faces the light source may be formed to be larger, and thus, more light may be reflected. Accordingly, the optical efficiency may be further improved. However, the size relationship between the reflective surface 131' and the inclined surface 132' is not limited to the above description.

Meanwhile, the board part 100' may further include a printing layer that is formed by printing a reflective material on a surface of the reflective boss 130'.

By printing the reflective material on the surface of the reflective boss 130', the reflectance and the re-reflectance may be further increased, and thus, the optical efficiency may be further improved. Here, a known reflective material may be applied as the reflective material.

Meanwhile, the optical resin layer 300' may further include a plurality of air gaps 320' that are formed in an interior of the optical body 310'. Furthermore, the plurality of air gaps 320' may be configured to guide light that reaches the air gap 320' through total internal reflection.

Specifically, the air gap 320' may be formed in an interior of the optical body 310' together when the optical resin layer 300' is manufactured. Light that is input to the optical resin layer 300' and reaches the air gap 320' may be scattered to reflect light. Then, light that is totally internal-reflected by the air gap 320' may be guided forward or may be guided to travel to the total-reflection optic 340' that will be described below. Furthermore, light that reaches the air gap 320' may be light that is emitted from a light source or reflected light.

The shape of the air gap 320' is not limited, and the air gap 320' may be formed in various shapes to be scattered to be reflected or re-reflected as long as a travel direction of light may be guided forward.

For example, the air gap 320' may have a width in the second direction that is greater than a width in the first direction, and a width in the second direction that is greater than a width in the third direction. That is, the air gap 320' may be formed to extend long in the second direction.

Accordingly, the air gap 320' may increase the reflectance of light that is emitted from a plurality of light sources that are spaced apart from each other in the second direction on the board part 100'.

Furthermore, a cross-sectional shape of the air gap 320' in a direction that is perpendicular to the second direction may be formed in a circular or polygonal shape. In the illustrated embodiment, an example, in which the shape of the air gap 320' is a triangular shape is illustrated. However, the cross-sectional shape of the air gap 320' is not limited to the illustrated embodiment, and may be formed in various shapes as long as the total reflectance may be increased.

Here, the shape of the air gap 320' may be formed depending on a lighting image. That is, the shape of the air gap 320' may be designed to be implemented as a desired image in consideration of a design of the lighting image.

Meanwhile, an embodiment of the present disclosure may further include an outer lens 400'. The outer lens 400' may include an accommodation space 411' that is assembled on the front surface of the optical resin layer 300' and accommodates the optical body 310'.

The optical body 310' includes a first area I' that is accommodated in the accommodation space 411' and a second area II' that is disposed outside the accommodation space 411', and the air gap 320' may be formed in the second area II'.

The outer lens 400' may include a lens body 410'.

The lens body 410' defines the body of the outer lens 400', and an accommodation space 411', in which at least a partial area of the optical body 310' in the first direction D1' may be accommodated, and which is opened toward the board part 100' may be formed.

The optical resin layer 300' may be entirely accommodated in the accommodation space 411' of the lens body 410', or a partial area including the front surface of the optical resin layer 300' may be accommodated therein. In the illustrated embodiment, a partial area of the optical resin layer 300' may be covered by the lens body 410'. When a partial area of the optical resin layer 300' is accommodated in the lens body 410', the optical resin layer 300' may include a first area I' that is accommodated in the accommodation space 411', and a second area II' that is disposed outside the accommodation space 411'.

For example, the air gap 320' may be formed in the second area II'. More specifically, the air gap 320' may be formed in an area that is adjacent to the light source part and is not covered by the outer lens 400'. Accordingly, light in the first area I' may be totally reflected by the outer lens 400', and light in the second area II' may be totally reflected by the air gap 320'.

Accordingly, a ratio, at which light input to the optical resin layer 300' is guided through total reflection, may be increased. Accordingly, the optical efficiency of the lamp for a vehicle may be further improved. However, the position of the air gap 320' is not limited to the illustrated embodiment, and may be formed, for example, in the first area I'.

Furthermore, the outer lens 400' may further include a fixing part 430'.

The fixing part 430' may be formed in the lens body 410' and may be assembled with the optical resin layer 300'. Furthermore, the optical resin layer 300' may further include an assembly part 350' that is configured to correspond to the fixing part 430'. Here, there is no limitation on the shape and assembly method of the fixing part 430' and the assembly part 350', and various methods may be applied when the optical resin layer 300' and the outer lens 400' may be assembled.

For example, the fixing part 430' and the assembly part 350' may be formed at a point, at which the first area I' and the second area II' meet each other. However, the positions of the fixing part 430' and the assembly part 350' are not limited thereto.

In FIGS. 15, 19, 21, and 23, an example of the assembly part 350' and the fixing part 430' is illustrated. For example, the assembly part 350' may include an assembly groove that is formed on the side surface of the optical body 310' to be concave.

Furthermore, the fixing part 430' may include a fixing boss that is formed at a rear end of the lens body 410' and protruding toward the accommodation space 411' to be inserted into the assembly groove.

Specifically, the optical resin layer 300' and the outer lens 400' may be assembled when the fixing boss is inserted into the assembly groove during assembly. The fixing boss may be continuously formed along a circumference of an opening of the lens body 410', and may protrude toward the accommodation space 411'. Furthermore, the assembly groove may be formed at a circumference of the side surface of the optical body 310' to be concave to correspond to the shape of the fixing boss.

However, the shapes of the fixing part 430' and the assembly part 350' are not limited to the illustrated embodiment. For example, although not illustrated, the assembly part 350' may include an assembly boss that protrudes from a side surface of the optical body 310'.

Furthermore, the fixing part 430' may include a stop boss formed to be stopped by the assembly boss to prevent the outer lens 400' from deviating from the optical resin layer 300' in the first direction D1'.

For example, the assembly boss may be continuously formed along a circumference of an opening of the lens body 410', and may protrude toward the accommodation space 411'. Furthermore, the stop boss may be formed at a position corresponding to the position of the fixing boss, and may be formed to be convex along a circumference of the side surface of the optical body 310'.

Accordingly, the optical resin layer 300' and the outer lens 400' may prevent the outer lens 400' from being separated from the optical resin layer 300' during assembly.

Accordingly, the assembly performance of the optical resin layer 300' and the outer lens 400' may be improved by the configurations of the assembly part 350' and the fixing part 430'.

Figure 22:
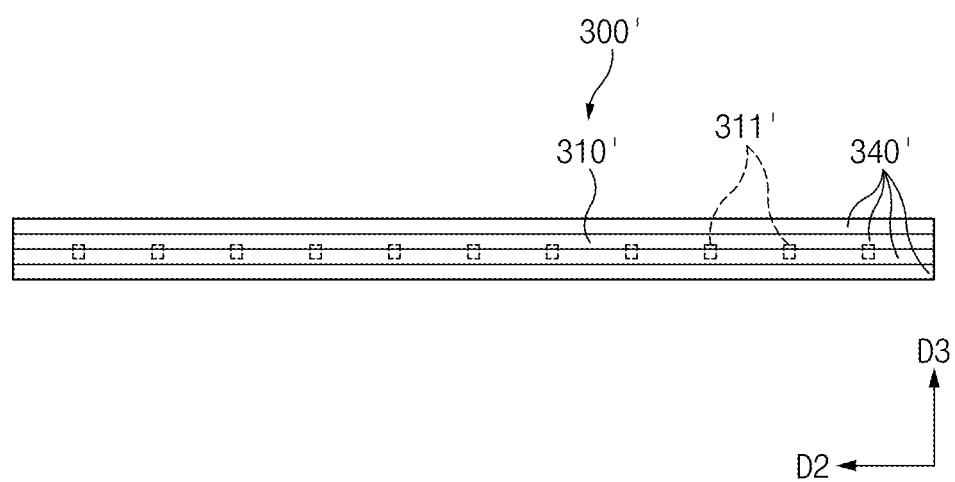
FIG. 22 is a front view illustrating a front surface of an optical resin layer according to a fourth embodiment of the present disclosure.
Figure 23:
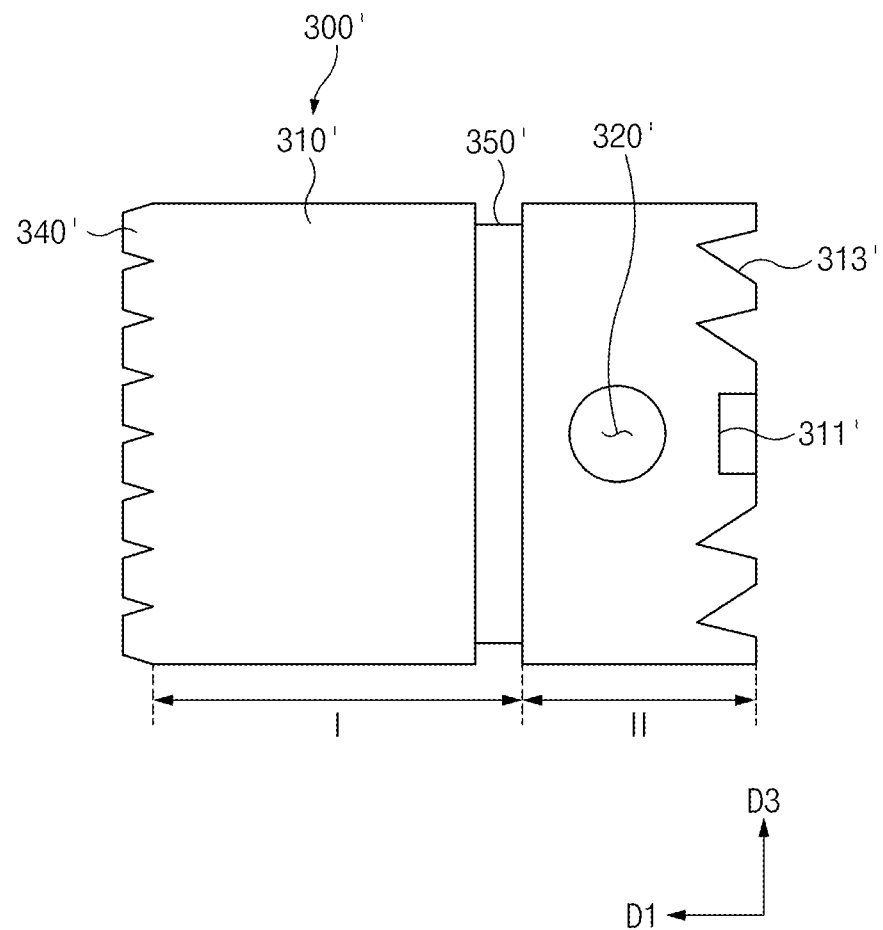
FIG. 23 is a side view illustrating a side surface of an optical resin layer according to a fourth embodiment of the present disclosure.

Meanwhile, in FIGS. 22 to 23, a fourth embodiment of the present disclosure is illustrated. FIG. 22 is a front view illustrating a front surface of an optical resin layer 300' according to a fourth embodiment of the present disclosure, and FIG. 23 is a side view illustrating a side surface of an optical resin layer 300' according to a fourth embodiment of the present disclosure.

The lamp for a vehicle according to the fourth embodiment of the present disclosure is different in that the optical resin layer 300' further includes a total-reflection optic 340' compared to the above-described third embodiment. The fourth embodiment of the present disclosure may include all configurations of the third embodiment of the present disclosure, except for the above-described differences. Hereinafter, detailed descriptions of the same configurations as the above-described configurations will be omitted.

According to the fourth embodiment of the present disclosure, the optical resin layer 300' may include an optical body 310' and a plurality of total-reflection optics 340' that protrudes from the surface of the optical body 310' and is integrally formed with the optical body 310'.

Furthermore, the total-reflection optic 340' may be configured to guide light emitted from the light source part through total internal reflection inside the optical body 310'.

The total-reflection optic 340' is a member that is formed on the surface of the optical body 310' to increase an optical efficiency of the lamp 10' for a vehicle through total internal reflection and to realize a uniform surface light emission image. Specifically, the total-reflection optic 340' may be formed on the surface of the optical body 310', and may be formed on at least the front surface in the surface.

Light that is input to the optical body 310' and reaches the total-reflection optic 340' may be reflected into the optical body 310' through total internal reflection, and may be guided forward or guided forward through re-reflection such that the light is emitted forward. Accordingly, according to the present disclosure, the optical efficiency may be increased, and the optical uniformity may be improved, and accordingly, a high-luminosity surface emission image may be implemented.

Furthermore, the total-reflection optic 340' according to an embodiment of the present disclosure may be integrally formed with the optical body 310'. Specifically, in an embodiment of the present disclosure, when the optical body 310' is manufactured, the total-reflection optic 340' is formed together as previously designed on the surface of the optical body 310', so that the optical body 310' and the total-reflection optic 340' may be integrally formed.

According to the fourth embodiment of the present disclosure, total reflection is performed inside the optical body 310' by the total-reflection optic 340' to improve the optical efficiency and the optical uniformity, whereby a high-luminosity surface light emission image may be implemented.

In an embodiment of the present disclosure, because the total-reflection optic 340' is integrally formed with the optical body 310', an additional process or a separate lens for realizing uniform surface light emission may not be required. Accordingly, a manufacturing performance may be improved, and costs may be advantageous.

Meanwhile, as described above, the shape of the total-reflection optic 340' may be formed in a bar shape that extends in the first direction D1' or the second direction D2'. That is, the total-reflection optic 340' may be formed to have the same cross section along the extension direction.

In the total-reflection optic 340', a cross-sectional shape in a direction that is perpendicular to the extension direction of the total-reflection optic 340' may be formed in an arc shape or a polygonal shape. However, the shape of the total-reflection optic 340' is not limited to those described above.

Meanwhile, a surface of the optical body 310' may include a front surface that faces the first direction D1', a rear surface that faces the board part 100', and a side surface between the front surface and the rear surface. Furthermore, the total-reflection optic 340' may be formed on a front surface or a side surface of the optical body 310'.

For example, referring to FIGS. 22 and 23, the total-reflection optic 340' may include a front total-reflection optic 340'. Hereinafter, for convenience of description, the front total-reflection optic 340' and the total-reflection optic 340' will be described by using the same reference numerals.

The front total-reflection optic 340' may be formed on the front surface of the optical body 310', and may be formed to extend in the second direction D2' or the third direction D3'. Furthermore, a plurality of front total-reflection optics 340' may be provided, and may be arranged to be spaced apart from each other in a direction that crosses an extension direction of the plurality of front total-reflection optics 340'.

For example, the front total-reflection optics 340' may be formed to extend in the second direction D2', as in the illustrated embodiment. The plurality of front total-reflection optics 340' may be arranged to be spaced apart from each other in the third direction D3' that is a direction that crosses the second direction D2'.

However, the extension direction and the arrangement direction of the front total-reflection optics 340' are not limited to the above description, and may be formed in various directions. For example, the front total-reflection optics 340' may extend in the third direction D3', and the plurality of front total-reflection optics 340' may be arranged to be spaced apart from each other in the second direction D2'. Furthermore, the front total-reflection optics 340' may be formed to extend in a direction other than the second direction D2' or the third direction D3'.

As described above, in an embodiment of the present disclosure, the plurality of front total-reflection optics 340' are continuously arranged along one direction, so that light may cause a plurality of total internal reflections in the optical body 310' and thus, an optical uniformity may be further improved.

Furthermore, although not illustrated, the total-reflection optic 340' may further include a side total-reflection optic.

The side total-reflection optic may be formed on the side surface of the optical body 310', and may be formed to extend in the first direction D1' or the second direction D2'. Furthermore, a plurality of side total-reflection optics may be provided, and may be arranged to be spaced apart from each other to cross an extension direction of the plurality of side total-reflection optic.

For example, the side total-reflection optics may be formed on one side and an opposite side of the optical body 310' in the third direction D3'. Furthermore, the side total-reflection optics may be formed to extend in the first direction D1', and the plurality of side total-reflection optics may be arranged to be spaced apart from each other along the second direction D2' that is a direction that crosses the extending direction.

In other words, the side total-reflection optic may protrude from an upper surface and a lower surface of the optical body 310'. The side total-reflection optic may extend in the front-rear direction, and the plurality of side total-reflection optics may be repeatedly arranged to be spaced apart from each other in the leftward/rightward direction.

Accordingly, the side total reflection optics may be formed to extend in a different direction (e.g., a crossing direction) from the front total-reflection optic 340', and may be arranged in different directions. Furthermore, the plurality of side total-reflection optics may be repeatedly arranged in the same shape while being formed at regular intervals.

Accordingly, even when light is emitted from the light source part at various angles, it is possible to induce total reflection in an interior of the optical resin layer 300'. Accordingly, the optical uniformity of the lamp for a vehicle may be further improved.

In addition to the front total-reflection optic 340', the optical resin layer 300' according to an embodiment of the present disclosure further includes a side total-reflection optic, and the side total-reflection optic may be arranged in a different direction from the front total-reflection optic 340' whereby the optical uniformity and the optical efficiency of the lamp 10' for a vehicle may be further improved.

According to the embodiment of the present disclosure as described above, the optical efficiency may be improved while the uniformity is secured, and thus, a high-luminosity surface emission image may be implemented.

According to an embodiment of the present disclosure, an additional process or a separate lens for implementing a uniform surface light emission image is not required, and thus, space limitations are small and it is advantageous in costs.

The present disclosure provides at least one of the following effects.

According to an embodiment of the present disclosure, a light efficiency may be improved while uniformity is secured, and thus, a high-luminosity surface emission image may be implemented.

According to an embodiment of the present disclosure, an additional process or a separate lens is not required to implement a uniform surface emission image, and thus, there are fewer spatial restrictions and it is advantageous in terms of costs.

Although specific embodiments of the present disclosure have been described above, the spirit and scope of the present disclosure are not limited to these specific embodiments, and various modifications and variations can be made by a person skilled in the art, to which the present disclosure pertains, without deviating from the gist of the present disclosure described in the claims.

What is claimed is:

1. A lamp for a vehicle, the lamp comprising:
a board part;
a light source part including a plurality of light sources mounted on a front surface of the board part; and
an optical resin layer provided on the front surface of the board part and configured to cover the plurality of light sources; and
an outer lens provided on a front surface of the optical resin layer,
wherein the optical resin layer includes:
an optical body; and
a plurality of first total-reflection optics protruding from a surface of the optical body, the first total-reflection optics integrally formed with the optical body,
wherein the optical resin layer is configured to totally reflect light emitted from the light source part and guide the light to a front surface of the optical body,
wherein a direction facing the optical resin layer from the board part is defined as a first direction, a direction being perpendicular to the first direction, and in which the optical resin layer extends, is defined as a second direction, and a direction being perpendicular to the first direction and the second direction is defined as a third direction,
wherein the optical body includes:
the front surface being a surface facing the first direction;
a rear surface being a surface facing the board part; and
a side surface provided between the front surface and the rear surface,
wherein the first total-reflection optics include a plurality of front total-reflection optics formed on the front surface of the optical body, and the plurality of front total-reflection optics are formed to extend in the second direction or the third direction,
wherein the plurality of front total-reflection optics are arranged in a direction crossing an extension direction of the front total-reflection optics,
wherein the outer lens includes:
a lens body configured such that at least a partial area of the optical body in the first direction is accommodated therein, and in which an accommodation space opened toward the board part is formed; and
a fixing part formed in the lens body, and configured to be assembled with the optical resin layer, and
wherein the optical resin layer further includes an assembly part configured to correspond to the fixing part.

2. The lamp of claim 1, wherein the first total-reflection optics further includes:
a plurality of side total-reflection optics formed on a side surface of the optical body, the first total-reflection optics formed to extend in the first direction or the second direction, and
wherein the plurality of side total-reflection optics are arranged in a direction crossing an extension direction of the side total-reflection optics.

3. The lamp of claim 2, wherein the plurality of side total-reflection optics are spaced apart from each other.

4. The lamp of claim 1, wherein a cross-sectional shape of the first total-reflection optics in a direction being perpendicular to an extension direction of the first total-reflection optics is formed in an arc shape or a polygonal shape.

5. The lamp of claim 1, wherein the assembly part includes an assembly groove formed on a side surface of the optical body is concave, and
wherein the fixing part includes a fixing boss formed at a rear end of the lens body and protruding toward the accommodation space to be inserted into the assembly groove.

6. The lamp of claim 1, wherein the assembly part includes an assembly boss protruding from a side surface of the optical body, and
wherein the fixing part includes a stop boss formed to be stopped by the assembly boss to prevent the outer lens from deviating from the optical resin layer in the first direction.

7. The lamp of claim 1, wherein the outer lens includes a plurality of second total-reflection optics integrally formed with at least one of a front surface and a side surface of the lens body, and wherein the outer lens is configured to guide light emitting from the optical resin layer through internal total reflection.

8. The lamp of claim 7, wherein the second total-reflection optics extend in a direction crossing a direction, in which the first total-reflection optics extend, and wherein the plurality of second total-reflection optics are arranged to be spaced apart from each other in a direction crossing a direction, in which the second total-reflection optics extend.

9. A lamp for a vehicle, the lamp comprising:

a board part;

a light source part including a plurality of light sources mounted on a front surface of the board part; and an optical resin layer provided on the front surface of the board part and configured to cover the plurality of light sources; and an outer lens assembled on a front surface of the optical resin layer, the outer lens including an accommodation space accommodating the optical body, wherein the board part includes a board and a plurality of reflective bosses protruding from a front surface of the board, wherein the plurality of reflective bosses are configured to reflect light emitted from the light source part forward and to be integrally formed with the board, wherein the optical resin layer includes:

an optical body; and a plurality of air gaps formed in an interior of the optical body, wherein the plurality of air gaps are configured to guide light having reached the air gaps through internal total reflection, wherein the optical body includes:

a first area accommodated in the accommodation space; and a second area disposed on an outside of the accommodation space, and wherein the air gaps are formed in the second area.

10. The lamp of claim 9, wherein the optical resin layer further includes:

a light source accommodating part formed in the optical body to accommodate the plurality of light sources; and a plurality of boss accommodating parts formed to correspond to the reflective bosses and formed in the optical body to accommodate the plurality of reflective bosses.

11. The lamp of claim 9, wherein the reflective bosses are formed in a convexly curved shape or a polygonal column shape.

12. The lamp of claim 9, wherein each of the reflective bosses includes:

a reflective surface formed to face the light source part, the reflective bosses being configured to reflect the light emitted from the light source part; and an inclined surface provided in an opposite direction to a direction facing the light source part of the reflective surface.

13. The lamp of claim 9, wherein the board part further includes:

a printing layer formed by printing a reflective material on a surface of the reflective boss.

14. The lamp of claim 9, wherein a direction facing the optical resin layer from the board part is defined as a first direction, and a direction being perpendicular to the first direction, and in which the optical resin layer extends, is defined as a second direction, wherein the air gaps are formed such that a width in the second direction is greater than a width in the first direction, and wherein a cross-sectional shape of the air gaps in a direction being perpendicular to the second direction is formed in a circular shape or a polygonal shape.

15. The lamp of claim 9, wherein the optical resin layer further includes:

a plurality of total-reflection optics protruding from a surface of the optical body, the plurality of total-reflection optics integrally formed with the optical body, and wherein the total-reflection optic is configured to guide the light emitted from the light source part in the optical body through internal total reflection.

16. The lamp of claim 15, wherein a direction facing the optical resin layer from the board part is defined as a first direction, a direction being perpendicular to the first direction, and in which the optical resin layer extends, is defined as a second direction, and a direction being perpendicular to the first direction and the second direction is defined as a third direction, wherein the optical body includes:

the front surface being a surface facing the first direction;

a rear surface being a surface facing the board part; and a side surface provided between the front surface and the rear surface, wherein the total-reflection optic includes a plurality of front total-reflection optics formed on the front surface of the optical body, the plurality of front total-reflection optics formed to extend in the second direction or the third direction, and wherein the plurality of front total-reflection optics are arranged to be spaced apart from each other in a direction crossing an extension direction of the front total-reflection optics.

* * * * *